(12) United States Patent
Thiesson et al.

(10) Patent No.: US 8,484,253 B2
(45) Date of Patent: Jul. 9, 2013

(54) VARIATIONAL MODE SEEKING

(75) Inventors: Bo Thiesson, Woodinville, WA (US); Jingu Kim, Lawrenceville, GA (US)

(73) Assignee: Microsoft Corporation, Redmond, WA (US)

(*) Notice: Subject to any disclaimer, the term of this patent is extended or adjusted under 35 U.S.C. 154(b) by 216 days.

(21) Appl. No.: 12/982,915

(22) Filed: Dec. 31, 2010

(65) Prior Publication Data

US 2012/0173527 A1 Jul. 5, 2012

(51) Int. Cl.
  *G06F 17/30* (2006.01)
  *G06K 9/62* (2006.01)
(52) U.S. Cl.
  USPC .......................... 707/802; 382/159
(58) Field of Classification Search
  None
  See application file for complete search history.

(56) References Cited

U.S. PATENT DOCUMENTS

| | | | |
|---|---|---|---|
| 6,272,519 B1* | 8/2001 | Shearer et al. | 718/104 |
| 6,981,135 B1* | 12/2005 | Trask | 713/1 |
| 7,174,344 B2 | 2/2007 | Campos et al. | |
| 7,480,079 B2 | 1/2009 | Han et al. | |
| 7,590,291 B2 | 9/2009 | Bradski | |
| 2003/0169942 A1* | 9/2003 | Comaniciu et al. | 382/276 |
| 2004/0179744 A1* | 9/2004 | Chang et al. | 382/240 |
| 2005/0286764 A1* | 12/2005 | Mittal et al. | 382/181 |
| 2006/0254876 A1* | 11/2006 | Baudat | 194/206 |
| 2009/0147994 A1* | 6/2009 | Gupta et al. | 382/103 |
| 2009/0271664 A1* | 10/2009 | Haas et al. | 714/48 |
| 2010/0131440 A1* | 5/2010 | Chen et al. | 706/15 |
| 2010/0312529 A1* | 12/2010 | Souche et al. | 703/2 |

OTHER PUBLICATIONS

"Accelerated convergence using dynamic Mean shift" dated Mar. 6, 2006.*
"From Sample Similarity to Ensemble Similarity: Probabilistic Disatance Measures in Reproducing Kernel Hilbert space" dated Apr. 10, 2006.*
Discrete-Signal Analysis and Design dated Jan. 7, 2008.*
"An Introduction to MCMC for Machine Learning" dated 2003.*
Quick shift and kernel Methods for Mode seeking dated Apr. 10, 2006.*
Cheng, Yizong., "Mean Shift, Mode Seeking, and Clustering", Retrieved at << http://users.isr.ist.utl.pt/~alex/Resources/meanshift.pdf >>, IEEE Transactions on Pattern Analysis and Machine Intelligence, vol. 17, No. 8, Aug. 1995, pp. 790-799.
Yuan, et al., "Half Quadratic Analysis for Mean Shift: with Extension to a Sequential Data Mode-Seeking Method", Retrieved at << http://ieeexplore.ieee.org/stamp/stamp.jsp?tp=&arnumber=4408979 >>, IEEE 11th International Conference on Computer Vision, Oct. 14-20, 2007, pp. 8.

(Continued)

*Primary Examiner* — Tarek Chbouki

(57) ABSTRACT

A mode-seeking clustering mechanism identifies clusters within a data set based on the location of individual data point according to modes in a kernel density estimate. For large-scale applications the clustering mechanism may utilize rough hierarchical kernel and data partitions in a computationally efficient manner. A variational approach to the clustering mechanism may take into account variational probabilities, which are restricted in certain ways according to hierarchical kernel and data partition trees, and the mechanism may store certain statistics within these trees in order to compute the variational probabilities in a computational efficient way. The clustering mechanism may use a two-step variational expectation and maximization algorithm and generalizations hereof, where the maximization step may be performed in different ways in order to accommodate different mode-seeking algorithms, such as the mean shift, mediod shift, and quick shift algorithms.

20 Claims, 8 Drawing Sheets

OTHER PUBLICATIONS

Carreira-Perpiñán, Miguel Á., "Fast Nonparametric Clustering with Gaussian Blurring Mean-Shift", Retrieved at << http://citeseerx.ist.psu.edu/viewdoc/download?doi=10.1.1.76.1834&rep=rep1&type=pdf >>, Machine Learning, Proceedings of the Twenty-Third International Conference, Jun. 25-29, 2006, pp. 8.

Sun, et al., "A Semi-supervised Classification Method Based on Transduction of Labeled Data", Retrieved at << http://166.111.72.3/szll/bodao/zhangchangshui/bigeye/paper/CIS04.pdf >>, IEEE Conference on Cybernetics and Intelligent Systems, 2004, pp. 5.

Shen, et al., "Fast Global Kernel Density Mode Seeking with application to Localisation and Tracking", Retrieved at << http://citeseerx.ist.psu.edu/viewdoc/download?doi=10.1.1.153.3021&rep=rep1&type=pdf >>, 10th IEEE International Conference on Computer Vision, Oct. 17-20, 2005, pp. 8.

Shen, et al., "Generalized Kernel-based Visual Tracking", Retrieved at <<http://arxiv.org/PS_cache/arxiv/pdf/0905/0905.2463v2.pdf >>, IEEE Transactions on Circuits and Systems for Video Technology, vol. 20, No. XX, Mar. 2010, pp. 1-12.

Comaniciu, et al., "Mean Shift: A Robust Approach toward Feature Space Analysis", Retrieved at << http://ieeexplore.ieee.org/stamp/stamp.jsp?tp=&arnumber=1000236 >>, IEEE Transactions on Pattern Analysis and Machine Intelligence, vol. 24, No. 5, May 2002, pp. 603-619.

Fukunaga, et al., "The Estimation of the Gradient of the Density Function, with Applications in Pattern Recognition", Retrieved at <<http://ieeexplore.ieee.org/stamp/stamp.jsp?arnumber=01055330 >>, IEEE Transactions on Information Theory, vol. IT-21, No. 1, Jan. 1975, pp. 32-40.

Carreira-Perpiñán, Miguel Á., "Gaussian Mean-shift is an EM Algorithm", Retrieved at << http://ieeexplore.ieee.org/stamp/stamp.jsp?tp=&arnumber=4135673 >>, IEEE Transactions on Pattern Analysis and Machine Intelligence, vol. 29, No. 5, May 2007, pp. 767-776.

Sheikh, et al., "Mode-seeking by Medoidshifts", Retrieved at << http://citeseerx.ist.psu.edu/viewdoc/download?doi=10.1.1.71.1161& rep=rep1&type=pdf >>, IEEE 11th International Conference on Computer Vision, Oct. 14-21, 2007, pp. 8.

Vedaldi, et al., "Quick Shift and Kernel Methods for Mode Seeking", Retrieved at << http://www.vision.ucla.edu/papers/vedaldiS08quick.pdf >>, Proceedings of the European Conference on Computer Vision, 2008, pp. 1-14.

Neal, et al., "A View of the EM Algorithm that Justifies Incremental, Sparse, and Other Variants", Retrieved at << http://www.cs.toronto.edu/pub/radford/emk.pdf >>, In Learning in Graphical Models, 1998, pp. 1-14.

\* cited by examiner

PROPERTY DEFINITION
—300

PROPERTY 1. *If*

$$D(a_p, a_M^i) < \frac{1}{2\alpha(a_p^{new}, a_M^i)} D_\Sigma(a_p, a_p^{new})$$

*then*

$$D(a_p, a_M^i) < D(a_p^{new}, a_M^i).$$

PROOF. First, notice that the Mahalanobis distance obeys the triangle inequality, and by that property $$D_\Sigma(a_p, a_M^i) < \tfrac{1}{2} D_\Sigma(a_p, a_p^{new})$$

implies $$D_\Sigma(a_p, a_M^i) < D_\Sigma(a_p^{new}, a_M^i).$$

Therefore, by simple algebraic manipulations $$D(a_p, a_M^i) < D(a_p^{new}, a_M^i)$$

if $$D_\Sigma(a_p, a_M^i) < \frac{\alpha(a_p, a_M^i)}{\alpha(a_p^{new}, a_M^i)} D_\Sigma(a_p^{new}, a_M^i)$$

$$< \frac{\alpha(a_p, a_M^i)}{2\alpha(a_p^{new}, a_M^i)} D_\Sigma(a_p, a_p^{new})$$

and the proof concludes by using the inequality $D(a_p, a_M^i) = \frac{1}{\alpha(a_p, a_M^i)} D_\Sigma(a_p, a_M^i).$

*FIG. 3*

PROPERTY DEFINITION
400

PROPERTY 2. In the metric space with a Mahalanobis distance metric, the ball with center $c$ and Mahalanobis radius $d_\Sigma^c$ that encloses the two balls with centers $a$ and $b$ and radiuses $d_\Sigma^a$ and $d_\Sigma^b$ is defined by $$c = \frac{1}{2}(b-a)\left(d_\Sigma(a,b) + d_\Sigma^b - d_\Sigma^a\right)$$

$$d_\Sigma^c = \frac{1}{2}\left(d_\Sigma^a + d_\Sigma(a,b) + d_\Sigma^b\right).$$

*FIG. 4*

The algorithm for the variational E-step:

//Initialization

For all nodes $v \in MPT$ do

Set $$K_v = 0$$
$$C_v = \sum_{(A,B):A=v} \exp(H(B))\exp(G(B|A))$$
$$D_v = C_v$$
$$L_v = \{B: (v,B) \text{ is in the block partition of } x \times \mu\} \text{ (The marks in the MPT)}$$

//Collect-up

For each $v \in MPT$; traversed bottom-up, level by level do

If $v$ is a leaf (that is $v = n$) do

Set pointer : $*\lambda_v = *\lambda_n$

Else

Select $u^* \in ch(v)$ and set pointer : $*\lambda_v = *\lambda_{u^*}$

Set $K_v = |v|\log D_{u^*} + \sum_{u \in ch(v)}(-|u|\log D_u + K_u)$

Set $D_v = C_v \exp\frac{K_v}{|v|} + D_{u^*}$

//Distribute-down & Finalize

//With a slight abuse of notation, $|\lambda_v|$ denotes the size of the *leaf node* in the MPT that has the same
// Lagrange multiplier as the node $v$. (Follow the pointers as setup in the collect-up phase.)
For each $v \in MPT$; traversed top-down, level by level do If $v$ is the root do Set value $\lambda_v = |\lambda_v| * (1 - \log D_v)$ Else //Here $v^*$ denotes the node for which the Lagrange multiplier was chosen as the
        //multiplier in the parent node $pa(v)$ during the collect-up phase.

Set value $\lambda_v = |\lambda_v| * \left(\frac{\lambda_{pa(v)}}{|\lambda_{pa(v)}|} + \log D_{v^*} - \log D_v\right)$ For each $B \in L_v$ Compute $\Lambda \left(= \sum_{n \in v} \lambda_n\right) = |v|\frac{\lambda_v}{|\lambda_v|} + K_v$ Set $q(B|v) = \exp\left(\frac{\Lambda}{|v|} - 1\right)\exp(H(B))\exp(G(B|v))$ //See Eq. (30)

*FIG. 7*

VARIATIONAL MODE SEEKING

BACKGROUND

Clustering is a component of machine learning, data mining, pattern recognition, image analysis, and bioinformatics. Clustering is sometimes known as automatic classification, botryology, topological analysis, cluster analysis, and other terms.

SUMMARY

A mode-seeking clustering mechanism identifies clusters within a data set based on the location of individual data points according to modes in a kernel density estimate. For large-scale applications the clustering mechanism may utilize rough hierarchical kernel and data partitions in a computationally efficient manner. A variational approach to the clustering mechanism may take into account variational probabilities, which may be restricted in certain ways according to hierarchical kernel and data partition trees, and the mechanism may store certain statistics within these trees in order to compute the variational probabilities in a computational efficient way. Some embodiments may employ a marked partition tree that may incorporate information from both a kernel tree and a data partition tree. The clustering mechanism may use a two-step variational expectation and maximization algorithm and generalizations hereof, where the maximization step may be performed in different ways in order to accommodate different mode-seeking algorithms, such as the mean shift, mediod shift, and quick shift algorithms.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings,

FIG. 3 is an illustration of an embodiment showing a first property definition.

FIG. 4 is an illustration of an embodiment showing a second property definition.

FIG. 7 is an illustration of an example embodiment showing an algorithmic description of an E-step.

DETAILED DESCRIPTION

Figure 1:
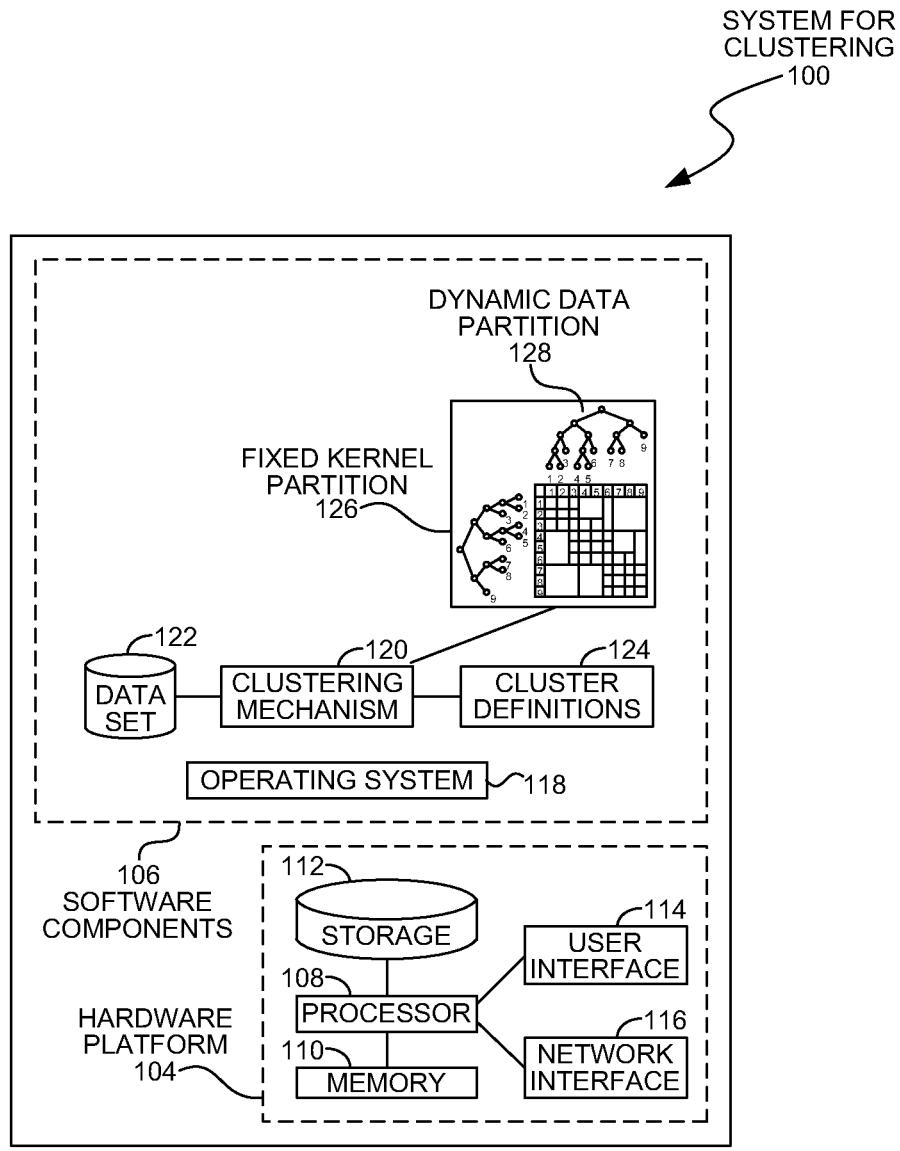
FIG. 1 is a diagram illustration of an embodiment showing a system with a clustering mechanism.

A variational mode seeking mechanism may move data points together into groups of data points that define clusters. Data points in different clusters may be considered different and the clustering can therefore be used to reason about the data in different ways for many different applications.

An efficient mechanism for mode seeking may use a variational Expectation-Maximization algorithm or a variational generalized Expectation-Maximization algorithm, and may use two types of approximation hierarchies: a hierarchy of dynamic data points that may be moved towards the modes or clusters, and a hierarchy of kernels in an underlying fixed kernel density function. In the hierarchies, statistics may be stored for portions of the data and the kernels so that a learning algorithm may reason from the portions of data rather than the individual data points.

The mechanism may allow for homoscedastic and heteroscedastic data models, and may further enable mean-shifting, mediod-shifting, and quick-shifting techniques to be applied to the data.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be for example, but not limited to, an electronic, magnetic, optical, electromagnetic, infrared, or semiconductor system, apparatus, device, or propagation medium. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and may be accessed by an instruction execution system. Note that the computer-usable or computer-readable medium can be paper or other suitable medium upon which the program is printed, as the program can be electronically captured via, for instance, optical scanning of the paper or other suitable medium, then compiled, interpreted, of otherwise processed in a suitable manner, if necessary, and then stored in a computer memory.

Communication media typically embodies computer-readable instructions, data structures, program modules or other data in a modulated data signal such as a carrier wave or other transport mechanism and includes any information delivery media. The term "modulated data signal" can be defined as a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above-mentioned should also be included within the scope of computer-readable media.

When the subject matter is embodied in the general context of computer-executable instructions, the embodiment may comprise program modules, executed by one or more systems, computers, or other devices. Generally, program modules include routines, programs, objects, components, data structures, and the like, that perform particular tasks or implement particular abstract data types. Typically, the functionality of the program modules may be combined or distributed as desired in various embodiments.

FIG. 1 is a diagram of an embodiment 100, showing a system that may identify clusters within a data set. Embodiment 100 is a simplified example of a computer system that may process a data set using a variational mode seeking analysis mechanism and produce clusters from the data set.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the described functions.

Embodiment 100 illustrates a device 102 that may be used to perform clustering. The device 102 may be a conventional computer device that may operate software components that may perform clustering operations. In other embodiments, the operations of the software components may be embodied in a gate array, programmable logic array, or other hardware component. The architecture of embodiment 100 is merely one example of a mechanism that may implement the mode seeking mechanism described below.

Device 102 may have a hardware platform 104 and various software components 106. The hardware platform 104 may comprise a processor 108, random access memory 110, and nonvolatile storage 112. The device 102 may also have a user interface 114 and a network interface 116.

In many embodiments, the device 102 may be a personal computer or code development workstation. The device 102 may also be a server computer, desktop computer, or comparable device. In some embodiments, the device 102 may still also be a laptop computer, netbook computer, tablet or slate computer, wireless handset, cellular telephone, game console, or any other type of computing device.

The hardware components 104 may include a processor 108, random access memory 110, and nonvolatile storage 112. The hardware components 104 may also include a user interface 114 and network interface 116. The processor 108 may be made up of several processors or processor cores in some embodiments. The random access memory 110 may be memory that may be readily accessible to and addressable by the processor 108. The nonvolatile storage 112 may be storage that persists after the device 102 is shut down. The nonvolatile storage 112 may be any type of storage device, including hard disk, solid state memory devices, magnetic tape, optical storage, or other type of storage. The nonvolatile storage 112 may be read only or read/write capable.

The user interface 114 may be any type of hardware capable of displaying output and receiving input from a user. In many cases, the output display may be a graphical display monitor, although output devices may include lights and other visual output, audio output, kinetic actuator output, as well as other output devices. Conventional input devices may include keyboards and pointing devices such as a mouse, stylus, trackball, or other pointing device. Other input devices may include various sensors, including biometric input devices, audio and video input devices, and other sensors.

The network interface 116 may be any type of connection to another computer. In many embodiments, the network interface 116 may be a wired Ethernet connection. Other embodiments may include wired or wireless connections over various communication protocols.

The software components 106 may include an operating system 118 on which various applications and services may operate. An operating system may provide an abstraction layer between executing routines and the hardware components 104, and may include various routines and functions that communicate directly with various hardware components.

The software components 106 may include a clustering mechanism 120 which may process a data set 122 to create cluster definitions 124. The clustering mechanism 120 may further utilize a fixed kernel partition 126 and a dynamic data partition 128 in order to perform the clustering in a computational efficient way.

The clustering mechanism 120 may execute an algorithm that may find clusters within a data set 122. The clustering mechanism may use a mode seeking algorithm, examples of which are defined below. The clustering mechanism 120 may use an expectation-maximization (EM) algorithm view on the mode-seeking clustering, where the Expectation step may generalize or approximate the Expectation step by breaking the product space of data and kernels into chunks, and processing these chunks as a whole. Such a mechanism may lower computational time while sacrificing a minimum of accuracy.

Mode Seeking

Let $\mu=(\mu_1, \ldots, \mu_M)$ denote a set of fixed data points for which the values cannot change, and let $x=(x_1, \ldots, x_N)$ denote a set of dynamic data points that are allowed to change (or shift) their values (or positions).

Mode-seeking clustering algorithms form a class of non-parametric clustering (or segmentation) algorithms that conceptually work as follows:

(1) Given the fixed $\mu_1, \ldots, \mu_M$, create a copy to be used as the dynamic $x_1, \ldots, x_N$. (Hence, M=N.)

(2) For each dynamic data point $x_n$ iteratively move this data points uphill towards a mode in the underlying kernel density function, defined as the finite mixture $$p(x_n) = \sum_{m=1}^{M} p(m) p(x_n | \mu_m, \Sigma_m), \quad (1)$$

where p(m) is the weight (or mixing proportion) for kernel m, and $$p\left(x_n \mid \mu_m, \sum_m\right) = \frac{1}{Z_m} K(D_{\Sigma_m}(x_n, \mu_m))$$

is a normalized Gaussian kernel function with profile $$K(z) = e^{-\frac{1}{2}z},$$

location $\mu_m$, bandwidth $\Sigma_m$, normalization $Z_m$, and $$D_{\Sigma_m}(x_n, \mu_m) = (x_n - \mu_m)^T \sum_m^{-1} (x_n - \mu_m)$$

is the Mahalanobis distance. For mode seeking algorithms it is standard that $$p(m) = \frac{1}{M}.$$

(3) Assign $\mu_i$ and $\mu_j$ to the same cluster if their associated dynamic points $x_i$ and $x_j$ have moved to the same mode for the kernel density function.

Mean-Shift & its EM Interpretation

Mean-shift is one version of a mode-seeking algorithm. The mean shift version of the mode seeking clustering algorithm may operate within the framework of the Expectation-Maximization (EM) algorithm. Conceptually, in this view, instead of maximizing the log-likelihood with respect to the parameters in the mixture model defined by the kernel density estimate, a log-likelihood is maximized with respect to each of the dynamic data points. That is, the EM view iteratively maximizes the log-likelihood $$l(x_n) = \log p(x_n) = \log \sum_{m=1}^M p(m) p(x_n \mid \mu_m, \Sigma_m) \quad (2)$$

independently for each dynamic point $x_n$, n=1, . . . , N, where each iteration consists of the following two steps:

E-step: Compute the posterior mixture-component membership probabilities $p(m|x_n)$ for m=1, . . . , M.

M-step: Maximize $E_{p(m|x_n)}[\log(p(m)p(x|\mu_m,\Sigma_m))]$ with respect to x; where $E_{p(m|x_n)}[\bullet]$ denotes the expectation with respect to the distribution $p(m|x_n)$, m=1, . . . , M. The maximization leads to the following update for the individual d-dimensional data points $$x_n \leftarrow \operatorname{argmax}_{x \in R^d} \sum_{m=1}^M p(m \mid x_n) \log p(x \mid m) + C \quad (3)$$

$$= \operatorname{argmin}_{x \in R^d} \sum_{m=1}^M p(m \mid x_n) D_{\Sigma_m}(x, \mu_m)$$

$$= \left(\sum_{m=1}^M p(m \mid x_n) \sum_m^{-1}\right)^{-1} \sum_{m=1}^M p(m \mid x_n) \sum_m^{-1} \mu_m$$

where $$C = \sum_{m=1}^M p(m \mid x_n) \log p(m) \text{ is independent of } x, \text{ and } p(m \mid x_n)$$

$$= \frac{p(x_n \mid m)}{M p(x_n)} \text{ for } p(m)$$

$$= \frac{1}{M}.$$

The updated $x_n$ is now used for the next iteration of EM, and this process continues until convergence.

Medoid-Shift & its (Generalized) EM Interpretation

The EM interpretation for mean-shift opens up for many mode-seeking variations, because the partitioning of each iteration into two steps (the E- and M-steps) offers a flexibility that is conceptually easy to understand. The medoid-shift algorithm may be a variation of the mean-shift algorithm, where the M-step in the above EM interpretation may be modified by computing the new position of $x_n$ as the weighted $$x_n \leftarrow \arg \max_{x=\mu_m, m=1,\ldots,M} \sum_{m=1}^M p(m \mid x_n) \log p(x \mid m) + C \quad (4)$$

$$= \arg \max_{x=\mu_m, m=1,\ldots,M} \sum_{m=1}^M p(m \mid x_n) D_{\Sigma_m}(x, \mu_m).$$

By restricting the optimization to only allow the update for $x_n$ to assign values from the fixed data points $\mu$, the M-step will increase the unrestricted log-likelihood but not necessarily maximize it, and therefore this interpretation of the medoid-shift is a generalized EM interpretation.

Quick-Shift & its (Generalized) EM Interpretation

By realizing that it is not necessary to minimize (4) in the M-step of the medoid-shift algorithm in order to obtain a convergent (generalized) EM algorithm, we can define a quick-shift algorithm, which in spirit is similar to other quick-shift algorithms. This quick-shift algorithm will simply assign the nearest neighbor that decreases (and not necessarily minimizes) the value in (4) to the updated value for $x_n$.

Variational Mode Seeking

The variational mode seeking algorithm may use any of the mode-seeking algorithms that can be explained in the (generalized) EM view with different M-step variations. A variational distribution may be introduced as:

$$q(m|n), m=1, \ldots, M \text{ and } n=1, \ldots, N \quad (5)$$

The posterior mixture-component membership probabilities $p(m|x_n)$ may be approximated as $q(m|n)$ in the E-step as described below. Using this approximation, the algorithm is still convergent, but will converge to a lower bound of the log-likelihood, where the tightness of this bound is determined by the quality of the approximation.

In the variational mode-seeking approach, each dynamic data point may not be considered individually, but instead the joint log-likelihood of the independent data points will be considered:

$$l(x) = l(x_1, \ldots, x_n) \quad (6)$$

$$= \sum_{n=1}^{N} \log p(x_n)$$

$$= \sum_{n=1}^{N} \log \sum_{m=1}^{M} p(m) p(x_n \mid \mu_m, \Sigma_m)$$

Introducing the variational distribution $q(m|n)$ and using Jensen's inequality $$l(x) = \sum_{n=1}^{N} \log \sum_{m=1}^{M} q(m \mid n) \frac{p(m) p(x_n \mid \mu_m, \Sigma_m)}{q(m \mid n)} \quad (7)$$

$$\geq \sum_{n=1}^{N} \sum_{m=1}^{M} q(m \mid n) \log \frac{p(m) p(x_n \mid \mu_m, \Sigma_m)}{q(m \mid n)}$$

$$= F(q, x). \quad (8)$$

And $$l(x) - F(q, x) = KL[q(\cdot \mid n) \| p(\cdot \mid x_n)], \quad (9)$$

where $KL[\cdot \| \cdot]$ denotes the Kullback-Leibler divergence between the two distributions in the arguments.

Equation (9) can also be realized from the following derivation $$l(x) - F(q, x) = \sum_{n=1}^{N} \log \sum_{m=1}^{M} q(m \mid n) \frac{p(m) p(x_n \mid \mu_m, \Sigma_m)}{q(m \mid n)} - \quad (10)$$

$$\sum_{n=1}^{N} \sum_{m=1}^{M} q(m \mid n) \log \frac{p(m) p(x_n \mid \mu_m, \Sigma_m)}{q(m \mid n)}$$

$$= \sum_{n=1}^{N} \sum_{m=1}^{M} q(m \mid n) \log \sum_{m=1}^{M} p(m) p(x_n \mid \mu_m, \Sigma_m) -$$

$$\sum_{n=1}^{N} \sum_{m=1}^{M} q(m \mid n) \log \frac{p(m) p(x_n \mid \mu_m, \Sigma_m)}{q(m \mid n)}$$

$$= \sum_{n=1}^{N} \sum_{m=1}^{M} q(m \mid n) \left( \log \sum_{m=1}^{M} p(m) p(x_n \mid \mu_m, \Sigma_m) - \log \frac{p(m) p(x_n \mid \mu_m, \Sigma_m)}{q(m \mid n)} \right)$$

$$= \sum_{n=1}^{N} \sum_{m=1}^{M} q(m \mid n) \log \frac{q(m \mid n)}{\frac{p(m) p(x_n \mid \mu_m, \Sigma_m)}{\sum_{m=1}^{M} p(m) p(x_n \mid \mu_m, \Sigma_m)}}$$

$$= KL[q(m \mid n) \| p(m \mid x_n)].$$

An iteration in the variational EM view on mode-seeking algorithms performs coordinate ascent on $F(q, x)$ by the following two steps E-step: $q^{t+1} = \arg\max_q F(q, x^t) = \arg\min_q KL[q(m|n) \| p(m|x_n^t)]$ M-Step:
For Mean-shift:

$$x^{t+1} = \arg\max_{x : x_n \in R^d \forall n} F(q^{t+1}, x) \quad (11)$$

leading to the following update for individual data points $$x_n^{t+1} = \left( \sum_{m=1}^{M} q^{t+1}(m \mid n) \sum_m^{-1} \right)^{-1} \sum_{m=1}^{M} q^{t+1}(m \mid n) \sum_m^{-1} \mu_m$$

For Medoid-Shift:

$$x^{t+1} = \arg\max_{x : x_n \in \mu \forall n} F(q^{t+1}, x) \quad (12)$$

leading to the following update for individual data points $$x_n^{t+1} = \arg\min_{x \in \mu} \sum_{m=1}^{M} q(m \mid n) D_{\Sigma_m}(x, \mu_m) \quad (13)$$

For Quick-shift: Similar to Medoid-shift, where the update for each individual data points is the nearest neighbor that decreases (and not necessarily minimizes) the value in (13).

Since the Kullback-Leibler divergence is always positive, $q(m|n)=p(m|x_n)$ maximizes the E-step, and, in this case, the variational (generalized) EM algorithm is equivalent to the standard (generalized) EM algorithm.

In some embodiments, $q(m|n)$ may be restricted to attain significant speedup in computational complexity over the standard mode-seeking algorithms, implying that $KL[q(\cdot|n) \| p(\cdot|x_n)]$ may not be zero, because $p(\cdot|x_n)$ is not in the allowable class of distributions for $q(\cdot|n)$. However, the E-step will minimize this KL divergence.

Data and Kernel Partition

Let us define a hierarchical partition for the fixed data points $\mu = \mu_1, \ldots, \mu_M$ and similar for the dynamic data points $x = x_1, \ldots, x_N$. Note that a kernel may be associated with each fixed data point, as indicated in Equation (1). The terms fixed data point and kernel are used interchangeably.

Figure 2:
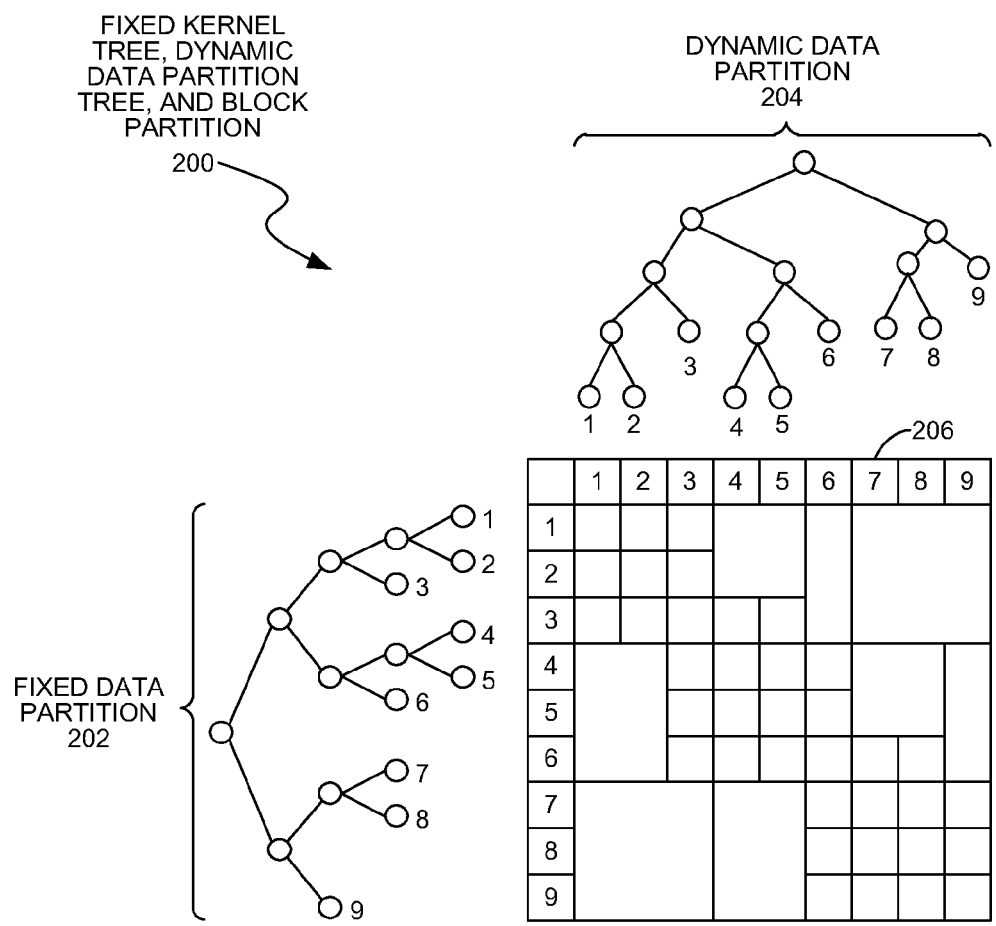
FIG. 2 is a diagram illustration of an example embodiment showing a fixed kernel partition, dynamic data partition, and block partition.

FIG. 2 illustrates an embodiment 200 showing a fixed kernel partition tree 202 and a dynamic data partition tree 204. We assume a partition of $x \times \mu$ into blocks $\{(A_1, B_1), \ldots, (A_P, B_P)\}$, where $A_p \subset x$ and $B_p \subset \mu$ for $p=1, \ldots, P$.

In FIG. 2, $A_p$ and $B_p$ correspond to nodes in, respectively, the dynamic data and the fixed kernel partition trees, and $(A_p, B_p)$ corresponds to a block (a square) in the partition table 206.

Computational efficiency may be increased by maintaining two partition trees: one for the data points that are shifted towards the modes and one for the kernels in the underlying fixed kernel density function. The two trees may be known respectively as a data partition tree and a kernel partition tree. A node in one of these trees may represent the union of the elements, either data points or kernels, for the elements represented by the node's children. Individual elements may not actually be stored in each node, but rather, the sufficient statistics for the estimation operations may be pre-computed and stored in a tree.

Any tree may be suitable for constructing a partition tree so long as there may be some degree of similarity between the data or kernels in a block.

The trees may represent computationally cheap, but rough, hierarchical clusterings of data and kernels. The clusterings may allow groups of data and kernels represented by a blocks in the partition table to be reasoned about in subsequent analyses.

An anchor tree construction may assume that all distance computations during the construction are performed according to the same isotropic distance metric. Such an assumption may be appropriate for constructing a data partition tree, because data simply specify a location in a given data space. Such a tree may be known as a homoscedastic anchor tree. In contrast to data, each kernel may additionally impose an individual distance metric, which may be included in the kernel partition tree. For homoscedastic kernels, all distance metrics may be the same.

The anchor tree construction algorithm may start with an anchor growing phase that for N elements gradually grows a set of $\sqrt{N}$ anchors A, which will become the leafs in an anchor sub-tree. Each anchor $a \in A$ has a pivot element $a_p$ and may maintain a list of individual member elements $a_m = \{a_M^i\}_i$, which may be data points or kernels sorted by decreasing order of distance to the pivot $D(a_M^i, a_p)$, $a_M^i \in a_M$. The list of elements in an anchor may have a characteristic that all elements in the anchor are closer to the pivot of that anchor than the pivot of any other anchor.

During the anchor growing phase, a new anchor $a^{new}$ may be added to the current set of anchors and its pivot element may be chosen as the element with largest distance to the pivot of the anchor that currently owns it. That is, $$a^{new} = \underset{a_M^i \in a_M, a \in M}{\operatorname{argmax}} D(a_M^i, a_p) \qquad (14)$$

The new anchor may now iterate through the member elements of current anchors and may "steal" elements with $D(a_M^i, a_p^{new}) < D(a_M^i, a_p)$. Because the list of elements in an anchor may already be sorted with respect to $D(a_M^i, a_p)$ computational efficiency may be achieved by not evaluating the remaing elements in the list once we discover that $D(a_M^i, a_p) < D(a_p^{new}, a_p)/2$, which guarantees that these elements cannot be stolen. Once a new anchor is done stealing elements from older anchors, its list of elements is sorted and no further sorting is needed for this anchor.

The anchor sub-tree construction now contains a phase that recursively merges the pair of anchors that results in the smallest distance from the pivot for the element farthest away. The leafs or anchors in the tree now contains $\sqrt{N}$ elements on average and we can subdivide further by recursively calling the sub-tree construction algorithm on the data in each leaf.

The Heteroscedastic Anchor Tree

Recall the normalized kernel function for data point x $$K_{\mu,\Sigma}(x) = \frac{1}{Z_\Sigma} K(D_\Sigma(x, \mu)) \qquad (15)$$

where $\mu$ and $\Sigma$ are the kernel location and bandwidth matrix, respectively, $Z_\Sigma$ is a normalization constant only depending on $\Sigma$, and K may be the profile depending on the Mahalanobis distance $$D_\Sigma(x,\mu) = (x-\mu)^T \Sigma^{-1}(x-\mu) \qquad (16)$$

When constructing the kernel tree, information about data are not be available. In order to group kernels in a way to reason about the groups, kernels may be grouped according to distance in location. For the distance computations between two kernels $a^i = K_{\mu_i,\Sigma_i}$ and $a_j = K_{\mu_j,\Sigma_j}$ use the bandwidth that will imply the most variability on data far away. That is, $$D(a^i, a^j) = \min \{D_{\Sigma_j}(\mu_i,\mu_j), D_{\Sigma_i}(\mu_j,\mu_i)\} \qquad (17)$$

We will assume that that kernel heteroscedacity stems from differently scaled bandwidths. For an arbitrary kernel with bandwidth $\Sigma$, the scaled bandwidths in the different kernels can now be represented as $\Sigma_i = \alpha_i \Sigma$. Hence, $$D(a^i, a^j) = \frac{1}{\alpha(a_i, a_j)} D_\Sigma(a^i, a^j)$$

where $\alpha(a_i, a_j) = \max \{\alpha_i, \alpha_j\}$ and $D_\Sigma(\bullet, \bullet)$ is the distance computed with respect to $\Sigma$.

The heteroscedastic anchor tree construction may proceed as for the homoscedastic case with this new distance measure and a modification to the criterion for when to stop traversing the sorted list of elements in an anchor. The property of FIG. 3 may be used to derive this criterion.

Notice that in the case of homoscedastic kernels, the conditioning statement in the property of FIG. 3 reduces to the criterion $D(a_M^i, a_p) < D(a_p^{new}, a_p)/2$ that guarantees that the remaining elements in $a_M$ cannot be stolen once the condition is satisfied for $a_M^i$. This guarantee follows directly by recalling that $a_M$ may be sorted with respect to distance from $a_p$ (high to low), and therefore $D(a_p, a_M^{i+k}) \leq D(a_p, a_M^i)$ for $k > 0$.

However, for heteroscedastic kernels, the dependence on $a_M^i$ (and $a_M^{i+k}$ for following elements) in the conditioning statement of the property in FIG. 3 has the consequence that we cannot assume that this condition is satisfied for $a_M^{i+k}$ once it is satisfied for $a_M^i$. The problem is that for some $a_M^{i+k}$, the scaling factor $\alpha(a_p^{new}, a_M^{i+k})$ may be greater than the factor for $a_M^i$. We can fix this problem by a slight modification to the criterion, as follows. Let $\bar{\alpha}$ denote the largest $\alpha$ used for scaling the kernels in $a_M \cup \{a_p^{new}\}$. It is now guaranteed that the remaining elements in $a_M$ cannot be stolen once we observe that $$D(a_p, a_M^i) < \frac{1}{2\bar{\alpha}} D_\Sigma(a_p, a_p^{new}) \qquad (18)$$

The heteroscedastic criterion is slightly less efficient than the homoscedastic criterion, because $\bar{\alpha} \leq 1$ (with equality in the homoscedastic case). Fortunately, $\bar{\alpha}$ decreases as the number of anchors increases, and, the savings by not having to evaluate all elements in an anchor may be significant when there are many anchors, because most of the old anchors discover immediately that none or only few of their elements can be stolen by a new anchor under construction.

Another reason for the slightly less efficient heteroscedastic criterion is the answer to how we efficiently keep track of $\bar{\alpha}$. We will in addition to maintaining the sorted list of elements $a_M$ also be maintaining a sorted (from high to low) list of scaling factors $\alpha_M$. Each element $a_M^i \in a_M$ may be linked to its corresponding $\alpha_M^j \in \alpha_M$, so when an element $a_M^i$ is stolen from $a_M$, the linked $\alpha_M^j$ is stolen from $a_M$ as well. Hence, $\bar{\alpha}$ may be efficiently found as the greater of the scaling factors for the pivot in the new anchor under construction and the first element in $\alpha_M$ for the old anchor currently being investigated.

The agglomeration of anchors into the anchor sub-tree may now be considered. The tree is constructed bottom-up by letting each anchor represent a leaf or node in the tree and then recursively merging the pair of most compatible nodes into a parent node until only one root node is left.

The compatibility of two nodes may be defined as follows. Notice that by construction, all element in an anchor are within a guaranteed distance of $D_\Sigma(a_p, a_M^1) = \alpha(a_p, a_M^1) D(a_p, a_M^1)$. In other words, in the metric space with a Mahalanobis distance metric, all elements in an anchor are enclosed in a ball that is centered at $a_p$ and has Mahalanobis radius $D_\Sigma(a_p, a_M^1)$. The compatability of two nodes is now measured by the radius of the smallest ball that completely contains the balls for the two nodes, and the most compatible nodes are those resulting in the smallest radius. By observing Mahalanobis distances along this line, it is a simple geometric argument that a line between the furthest apart points on two balls passes through the center of the balls. It therefore follows that the enclosing ball will have characteristics as defined by the property defined in FIG. 4.

The Block Constrained Variational Distribution

Given the data and kernel partition trees, and a mutually exclusive and exhaustive partition for the product space of data and kernels into blocks $\{(A_1, B_1), \ldots, (A_P, B_P)\}$, where $A_P$ is a part of the data and $B_P$ is a part of the kernels, corresponding to nodes in the two Respective trees—as previously defined in FIG. 2. This partition may group data and kernels together for which kernels are unable to differentiate between the data in any significant way. Our variational distribution q will then for all the data in a block assign the same variational membership for all the mixture components defined by the kernels in the block. That is, $$q(m|n) = q(B_p|A_p) \text{ for all } (n,m) \in (A_p, B_p) \quad (18)$$

where $(n, m) \in (A_p, B_p)$ is a notational convenient representation for $(x_n, K_{\mu_m, \Sigma_m}) \in (A_p, B_p)$. FIG. 2 illustrates a block partition where, for example, $q(1|4) = q(1|5) = q(2|4) = q(2|5)$.

The variational distributions $q(\cdot|n)$ are standard probability distributions and must therefore satisfy the sum-to-one constraint $\Sigma_m q(m|n) = 1$. The positivity constraints $q(m|n) > 0$ are automatically satisfied during estimation of q and are therefore not treated as explicit constraints. By integrating the block constraints in (18) into these standard sum-to-one constraints, we obtain the following N constraints $$\Sigma_{p; n \in A_p} |B_p| q(B_p|A_p) = 1 \text{ for all } n \in \{1, \ldots, N\} \quad (19)$$

The constraint associated with data point n involves exactly the $q(B_p|A_p)$ for which $n \in A_p$ in the block partition. In FIG. 2, the variational probabilities involved in a constraint are therefore those $q(B_p|A_p)$ encountered on the column under a data partition leaf in the block partition table. For example, for the data partition leaf corresponding to data point n=1, the corresponding constraint is $$q(1|1) + q(2|1) + q(3|1) + 3q(4-6|1-2) + 3q(7-9|1-3) = 1 \quad (19)$$

where $q(m_1-m_2|n_1-n_2)$ is the probability assigned to the block with kernels $m_1$ through $m_2$ and data points $n_1$ through $n_2$.

The constraints in (19) complicates the optimization of q in the E-step, because they are intertwined in the sense that some variational probabilities involved in one constraint may also appear as a part of another constraint. Fortunately, this complication can be alleviated, because it turns out that it is possible to represent the block constraints in the form of a so-called marked partition tree or MPT.

Figure 5:
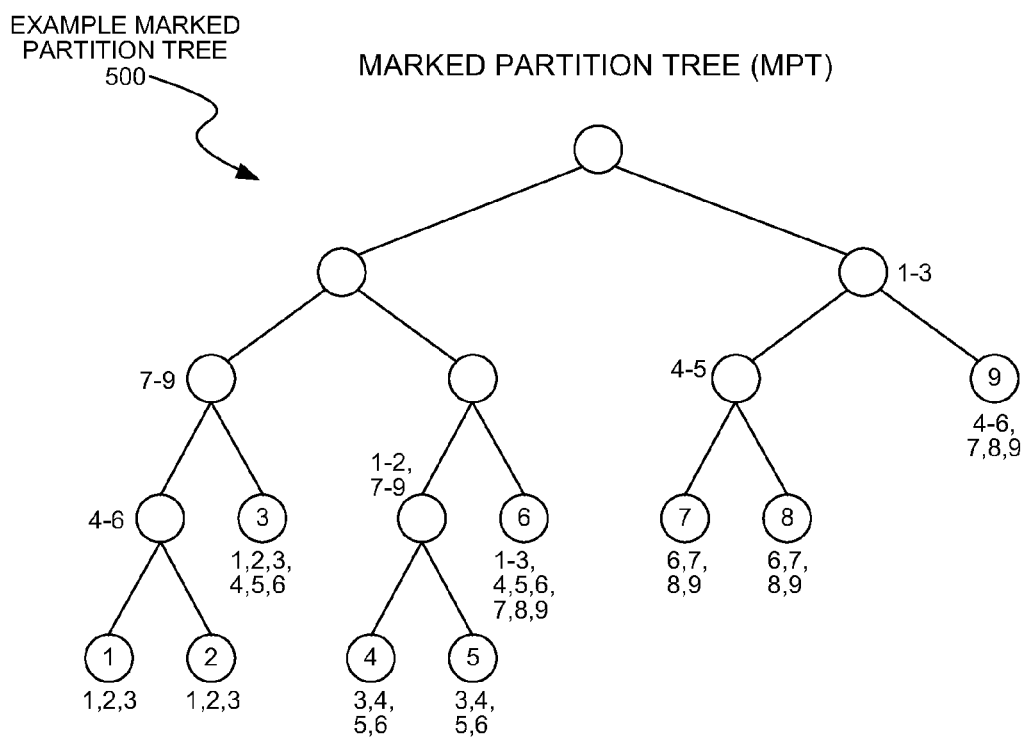
FIG. 5 is a diagram illustration of an example embodiment showing a marked partition tree.

FIG. 5 illustrates an example embodiment 500 showing a marked partition tree (MPT). A MPT is similar to the data partition tree, but with an additional encoding of data partitions that relates to specific components in a mixture model, as follows. If $A_p$ is a data block in the partition for mixture component m, then the corresponding node in the tree is marked by an identifier for that component. Now, recall that the kernels in the kernel density estimate for each data point correspond to the components in a mixture model. We, accordingly, create a MPT from a block partition by simply marking the node in the data partition tree corresponding to $A_p$ with the mark $B_p$ for each block $(A_p, B_p)$ in the partition. For example, for the block partition in FIG. 2 the MPT will appear as in FIG. 5. The MPT of FIG. 5 has a group of kernels in a block to be marked together instead of insisting on individual marks for each mixture component defined by the kernels in the block. For example, the marks $B_p \in \{1-2, 7-9\}$ may be used instead of the marks $B_p \in \{1, 2, 7, 8, 9\}$ for $A_p = 4-5$ in FIG. 5. This difference may add to computational efficiency, as we will see later.

By construction, each path from a leaf n to the root in the MPT has the property that it marks all $B_p$ for which $n \in A_p$ and $(A_p, B_p)$ is in the block partition. The MPT therefore also defines the constraints in (19). However, the MPT representation may have an additional benefit of representing the constraints in an explicit tree structure that is exploited during the efficient estimation of q in the E-step.

As a final caveat, it is in fact possible that the lowest marked nodes in the tree are not leaf nodes. If $A_p$ is such a node, all constraints in (19) for $n \in A_p$ will be redundant. In this case the MPT construction process proceeds by pruning all unmarked nodes without marked descendants from the tree, which in effect reduces the number of constraints in (19) to the lower number of non-redundant constraints associated with paths from leaves to the root in the reduced tree.

Block Selection

Figure 6:
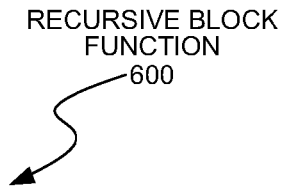
FIG. 6 is an illustration of an embodiment showing a recursive block definition method.

The $(A_p, B_p)$ blocks in FIG. 2 may be constructed by a recursive traversal of the data and kernel partition trees. Let a denote a node in the data partition tree and b denote a node in the kernel partition tree. Starting from a and b being the roots of their respective trees, the blocks may be constructed by a call to the recursive function of FIG. 6.

Here Block (a, b) creates one of the $(A_p, B_p)$ blocks in FIG. 2.

The CanBlock(a, b, γ) is a criterion which determines if a and b are far enough apart that the group of kernels in b is unable to differentiate between a group of data in a to a certain degree determined by a user-specified parameter γ.

Letting $\alpha$ and $\overline{\alpha}$ denote the smallest and largest factor used to scale the reference bandwidth Σ for the kernels in node b. The distance from any kernel in b to any data point in a (from the view point of b) cannot be smaller than $$D_{min}(a, b) = \max\left\{0, \frac{1}{\overline{\alpha}} D_\Sigma(a_p, b_p) - \frac{1}{\underline{\alpha}} D_\Sigma(a_p, a_M^1) - D(b_p, b_M^1)\right\} \quad (20)$$

and the distance cannot be larger than $$D_{max}(a, b) = \frac{1}{\underline{\alpha}} D_\Sigma(a_p, b_p) + \frac{1}{\underline{\alpha}} D_\Sigma(a_p, a_M^1) + D(b_p, b_M^1) \quad (21)$$

A CanBlock criterion can now be defined as a threshold for the relative distance between kernel evaluations based on the smallest and largest possible distances from b to a $$\frac{\frac{1}{Z_{\Sigma_{min}}}K(D_{min}) - \frac{1}{Z_{\Sigma_{max}}}K(D_{max})}{\frac{1}{Z_{\Sigma_{max}}}K(D_{max})} < \gamma \quad (22)$$

where $\Sigma_{min}$ and $\Sigma_{max}$ denote the unknown bandwidths leading to the smallest and largest distances. For the heteroscedastic Gaussian kernels the criterion becomes $$\frac{\left(\frac{|\Sigma_{max}|}{|\Sigma_{min}|}\right)^{-1/2} K(D_{min}) - K(D_{max})}{K(D_{max})} < \gamma \quad (23)$$

By the restriction of heteroscedasity to scaled bandwidths, $\Sigma_{min} = \alpha_{min}\Sigma$ and $\Sigma_{max} = \alpha_{max}\Sigma$. The unknown factor in (23) can therefore be bounded as follows $$\left(\frac{|\Sigma_{max}|}{|\Sigma_{min}|}\right)^{-1/2} = \left(\frac{\alpha_{max}}{\alpha_{min}}\right)^{-d/2} |\Sigma|^{-1/2} \le (\alpha/\overline{\alpha})^{-\frac{d}{2}} |\Sigma|^{-\frac{1}{2}} \quad (24)$$

Using this bound instead of the unknown factor in (23) guarantees that the threshold $\gamma$ for the CanBlock criterion will not be violated.

For homoscedastic kernels $\underline{\alpha} = \overline{\alpha} = 1$, and the criterion in this case simplifies to $$\frac{K(D_{min}) - K(D_{max})}{K(D_{max})} < \gamma \quad (25)$$

Efficient Variational E-Step

With the block constraints in (18) on the variational distribution, the decomposition of $F(x, q)$ in (7) reduces to $$F(x, q) = \sum_{p=1}^{P} |A_p||B_p| q(B_p|A_p)[-\log q(B_p|A_p) + H(B_p) + G(B_p|A_p)] \quad (26)$$

where, for $p(m) = 1/M$, $$H(B_p) = \frac{1}{|B_p|} \sum_{m \in B_p} \log p(m) = -\log(M) \quad (27)$$

and $$G(B_p | A_p) = \frac{1}{|A_p||B_p|} \sum_{n \in B_p} \sum_{m \in B_p} \log p\left(x_n | \mu_m, \sum_m\right) \quad (28)$$

Notice that the block-specific geometric mean $G(A|B)$ is the only part of $F(x,q)$ that depends on specific data and kernel parameters.

The constraints in (19) may then be integrated into the maximization of $F(x,q)$ with respect to $q$ by use of the Lagrange multiplier method. Introducing the Lagrange multipliers $\lambda = (\lambda_1, \ldots, \lambda_N)$ for the constraints, we construct the Lagrangian $$F(x, q, \lambda) = F(x, q) + \sum_{n=1}^{N} \lambda_n \left(\sum_{p:n \in A_p} |B_p| q(B_p | A_p) - 1\right) \quad (29)$$

By setting $$\frac{\partial F(x, q, \lambda)}{\partial (B_p | A_p)} = 0$$

and solving all for $q(B_p|A_p)$ we obtain the solution $$q_\lambda(B_p|A_p) = \exp\left(\frac{1}{|A_p|} \sum_{p:n \in A_p} \lambda_n - 1\right) \exp(H(B_p)) \exp(G(B_p|A_p)) \quad (30)$$

where the $\lambda$ subscript in $q_\lambda(B_p|A_p)$ indicates that this solution is still a function of $\lambda$.

A closed-form solution to the constrained optimization problem can now be found by inserting $q_\lambda(B_p|A_p)$ into the constraints in (19) and then exploit the tree structure of these constraints, as represented by the MPT, to gradually solve for $\lambda$. Following, by inserting this $\lambda$ into (30), we finally obtain the optimal value for the variational probabilities $q_\lambda(B_p|A_p)$, $p=1, \ldots,$ .

An algorithmic description of the E-step may be found in FIG. 7.

Sufficient Statistics

It is key to the computational efficiency of the variational E-step that sufficient statistics for $G(B_p|A_p)$ factorizes into data-specific statistics and kernel-specific statistics in this way avoiding computation of statistics on the product space of data and kernels. These statistics can therefore be pre-computed separately and stored at the nodes in the respective partition trees prior to the actual mode-seeking process. For heteroscedastic Gaussian kernels with profile defined on the Mahalanobis distance $$G(B_p|A_p) = \frac{1}{|A_p||B_p|} \sum_{n \in A_p} \sum_{m \in B_p} \log p\left(x_n | \mu_m, \sum_m\right) \quad (31)$$

$$= c - \frac{1}{2} \left[ \frac{1}{|B_p|} \sum_{m \in B_p} \log\left|\sum_m\right| + \frac{1}{|A_p||B_p|} \sum_{n \in A_p} \sum_{m \in B_p} (x_n - \mu_m)^T \sum_m^{-1} (x_n - \mu_m) \right]$$

$$= c - \frac{1}{2} \left[ \left\langle \log\left|\sum_m\right|\right\rangle_{B_p} + \frac{1}{|B_p|} \sum_{m \in B_p} \left( \begin{array}{c} \mu_m^T \sum_m^{-1} \mu_m + \\ \left\langle x_n^T \sum_m^{-1} x_n \right\rangle_{A_p} - \\ 2\mu_m^T \sum_m^{-1} \langle x_n \rangle_{A_p} \end{array} \right) \right]$$

$$= c - \frac{1}{2} \left[ \left\langle \log\left|\sum_m\right|\right\rangle_{B_p} + \left\langle \mu_m^T \sum_m^{-1} \mu_m \right\rangle_{B_p} + \frac{1}{|B_p|} \sum_{m \in B_p} \left\langle x_n^T \sum_m^{-1} x_n \right\rangle_{A_p} - 2\left\langle \mu_m^T \sum_m^{-1} \right\rangle_{B_p} \langle x_n \rangle_{A_p} \right]$$

$$= c - \frac{1}{2} \left[ \begin{array}{l} \left\langle \log|\sum_m| \right\rangle_{B_p} + \left\langle \mu_m^T \sum_m^{-1} \mu_m \right\rangle_{B_p} + \\ Tr\left( \left\langle \sum_m^{-1} \right\rangle_{B_p} \langle x_n^T x_n \rangle_{A_p} \right) - 2\left\langle \mu_m^T \sum_m^{-1} \right\rangle_{B_p} \langle x_n \rangle_{A_p} \end{array} \right]$$

where $$c = -\frac{1}{2} Nd\log(2\pi)$$

with d being the number of features in a data point, $\langle \bullet \rangle_{A_p}$ and $\langle \bullet \rangle_{B_p}$ denote averages over $n \in A_p$ and $m \in B_p$, respectively, and $Tr(\bullet)$ denotes the trace of a matrix. Notice that the sufficient statistics factorizes into data-specific and kernel-specific parts.

For the homoscedastic Gaussian kernels, G $(B_p|A_p)$ simplifies to $$G(B|A) = c - \frac{1}{2} \left[ \begin{array}{l} \log|\sum| + Tr\left( \sum^{-1} \langle \mu_m^T \mu_m \rangle_{B_p} \right) + \\ Tr\left( \sum^{-1} \langle x_n^T x_n \rangle_{A_p} \right) - 2\langle \mu_m^T \rangle_{B_p} \sum^{-1} \langle x_n \rangle_{A_p} \end{array} \right] \quad (32)$$

Efficient Variational M-Step

The nodes in the MPT will after the E-step in the t'th iteration of the algorithm contain the computed $q^{t+1}(B_p|A_p)$. Recall that $q^{t+1}(m|A_p) = q^{t+1}(B_p|A_p)$ for all $m \in B_p$. The update for each $x_n^t$ can now be efficiently computed by following the path from leaf n to the root in the MPT, while computing the update for the three different variational mode-seeking algorithms as follows.

For heteroscedastic kernels an efficient update for mean shift becomes $$x_n^{t+1} \left( \sum_{p:n \in A_p} |B_p| q^{t+1}(B_p|A_p) \left\langle \sum^{-1} \right\rangle_{B_p} \right)^1 * \quad (32)$$

$$\sum_{p:n \in A_p} |B_p| q^{t+1}(B_p|A_p) \left\langle \sum_m^{-1} \mu_m \right\rangle_{B_p}$$

For homoscedastic kernels this expression simplifies to $$x_n^{t+1} = \sum_{p:n \in A_p} \frac{|B_p| q^{t+1}(B_p|A_p) \langle \mu_m \rangle_{B_p}}{\sum_{p:n \in A_p} |B_p| q^{t+1}(B_p|A_p)} \quad (33)$$

Notice that the statistics $\langle E_m^{-1} \rangle_{B_p}$, $\langle E_m^{-1} \mu_m \rangle_{B_p}$, and $\langle \mu_m \rangle_{B_p}$ have already been pre-computed and stored in the kernel partition tree prior to the mode seeking.

Medoid Shift

For heteroscedastic kernels the efficient variational M-step corresponding to the update in (4) can utilize the following equality $$\sum_{m=1}^M q(m|n) D_{\Sigma_m}(x, \mu_m) = \sum_{p:n \in A_p} |B_p| q^{t+1}(B_p|A_p) \quad (34)$$

$$\left( \left\langle \mu_m \sum_m^{-1} \mu_m^T \right\rangle_{B_p} + Tr\left( \left\langle \sum_m^{-1} \right\rangle_{B_p} x^T x \right) - 2\left\langle \mu_m^T \sum_m^{-1} \right\rangle_{B_p} x \right)$$

For homoscedastic kernels the equality simplifies as $$\sum_{m=1}^M q(m|n) D_{\Sigma_m}(x, \mu_m) = \sum_{p:n \in A_p} |B_p| q^{t+1}(B_p|A_p) \quad (35)$$

$$\left( Tr\left( \sum^{-1} \langle \mu_m \mu_m^T \rangle_{B_p} \right) + Tr\left( \sum^{-1} x^T x \right) - 2\langle \mu_m^T \rangle_{B_p} \sum^{-1} x \right)$$

Notice again that all statistics have already been pre-computed and stored in the kernel partition tree prior to the mode seeking.

Quick Shift

The M-step in quick shift computes the same type of quantities as the M-step for medoid shift. However, instead of the minimization over all data points (as in (*b)), quick shift only investigates nearest neighbors until a guaranteed nearest neighbor which decreases the value is found. This nearest neighbor search can be efficiently conducted by considering the leaf in the data partition tree that represents $x_n$ and then backtrack through the tree. During this backtracking phase the knowledge about the pivot and the furthest distance that any data point covered by a node in the tree can have from its pivot can be used to not consider parts of the tree, where it is guaranteed that a closer candidate to the current best candidate cannot be found.

Notice that for Mediod shift and Quick shift that each dynamic data point is shifted to a location that corresponds to a location of a data point in the initial data set. Once a shift has been computed for all initial data points in the data set, the result of the next shift has already been computed. In such situations, the first iteration is expressly computed, while remaining iterations are implicitly derived from the first iteration.

Non-Euclidian Distances

Above, the unified variational view on mode seeking was presented in a Euclidean setting, with the Mahalanobis distance measure introduced from a proper inner product. This view may be extended to a non-Euclidian setting via a finitely positive semi-definite function $\kappa(\bullet,\bullet): X \times X \to \mathbb{R}$, where X may be a non-Euclidean input space. The finitely positive definiteness of $\kappa(\bullet,\bullet)$ ensures the existence of a decomposition into an inner product of its arguments under a feature mapping into a Hilbert space $\mathcal{H}$, $\phi(\bullet): X \to \mathcal{H}$, i.e.:

$$\kappa(x,y) = \phi(x)^T \phi(y) \quad (36)$$

Assuming an explicit representation of the mapping $\phi(\bullet)$, which will allow the mode-seeking algorithms to be performed in the Hilbert space.

The G $(B_p|A_p)$ statistics used in the variational mode-seeking algorithms explicitly depends on the induced distance measure in Hilbert space, which can be computed as $$D(x,y) = \kappa(x,x) + \kappa(y,y) - 2\kappa(x,y) \quad (37)$$

The bilinearity of the inner product ensures that these statistics factorize into data-specific and kernel-specific parts, which is useful to store these statistics in the two partition trees.

For example, consider the cosine similarity measure $$\kappa(x, y) = \cos(x, y) = \frac{x^T y}{\|x\|\|y\|} \quad (38)$$

where x,y are non-negative vectors. The cosine similarity induces an explicit embedding $$\phi(x) = \frac{x}{\|x\|}$$

into a Hilbert space with a proper distance measure $$D(\phi(x),\phi(y))=2-2\kappa(x,y) \quad (39)$$

The expression for $G(B_p|A_p)$ now simplifies to:

$$G(B_p|A_p) = c - \left[1 - \left\langle\frac{x^T}{\|x\|}\right\rangle A_p \left\langle\frac{\mu_m}{\|\mu_m\|}\right\rangle B_p\right] \quad (40)$$

by exploiting the explicit mapping into the Hilbert space and the bilinearity of the inner product. Notice that the sufficient statistics used to compute $G(B_p|A_p)$ again factorizes into data-specific and kernel-specific parts.

Figure 8:
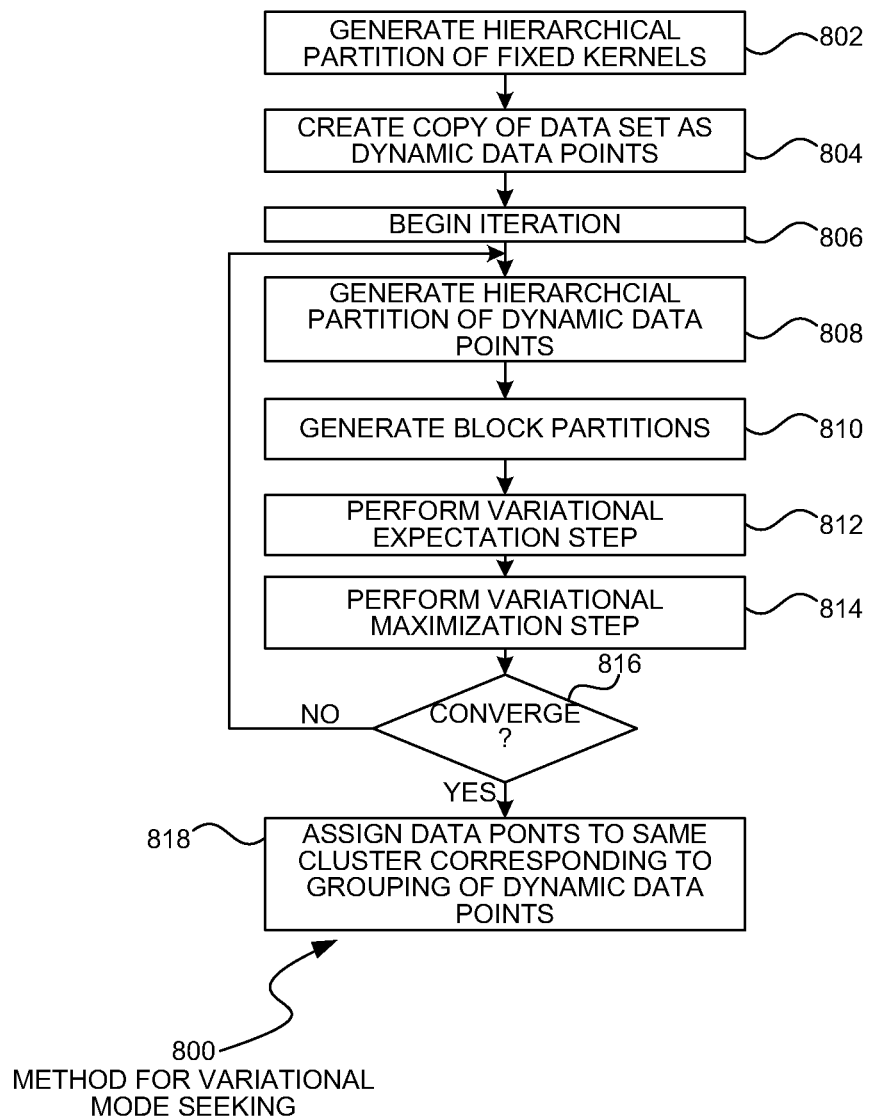
FIG. 8 is a flowchart illustration of an embodiment showing a method for mode seeking.

FIG. 8 is a flowchart illustration of an embodiment 800 showing a method for variational mode seeking. Embodiment 800 is an example method by which a set of data points may be analyzed to determine clusters of data using the processes described above.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

In block 802, a hierarchical kernel partition may be created. The kernels that are used in this hierarchical partition are defined in such a way that each kernel's location parameter corresponds to a different data point in the data set.

In block 804, the data set may be copied into a set of dynamic data points. The dynamic data points may be moved during a variational expectation-maximization process, and finally the original data points may be assigned to clusters in accordance with the modes in the underlying kernel density function that the dynamic data points moves to, as follows.

In block 806, an iterative step may begin. The process may iterate to convergence.

A hierarchical partition of the dynamic data points may be generated in block 808, and a block partition may be generated in block 810. The block partition in block 810 may be defined by an iterative procedure that involves both the hierarchical kernel and data partitions. An example of this procedure may be the procedure described in embodiment 600. An example of the blocks in a resulting block partition may be the block partition table 206 of embodiment 200.

Within each of the blocks of the block partition table 206, all of the data points may be considered to be similar enough that they can be processed via pre-computed sufficient statistics through the variational expectation and maximization steps. In this manner, the variational expectation and maximization steps may be performed.

The variational expectation step may be performed in block 812. An example of the expectation step may be found earlier in this specification in the section entitled "Efficient Variational E-step" and an algorithmic description in FIG. 7.

A variational maximization step may be performed in block 814. The maximization step may be performed using mean shift, mediod shift, quick shift, or other maximization steps. Examples of such steps may be found earlier in this specification in the section entitled "Efficient Variational M-step".

If the convergence has not occurred in block 816, the process may return to block 808 for more analysis.

Once convergence has occurred in block 816, the clustering of the original data points may be determined according to the grouping of associated dynamic data points at modes in the underlying kernel density function in block 818.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer-implemented method for generating clusters of data points within a given fixed data set, said method comprising:

generating a hierarchical partition of a plurality of fixed kernels, each of said fixed kernels having a fixed location at a data point in said fixed data set and each kernel's location parameter corresponding to a different data point in the data set;

creating a copy of said data set to create a set of dynamic data points;

iteratively moving said dynamic data points using a variational expectation-maximization process to approximate kernel density modes by iteratively until convergence performing a first method comprising:

generating an initial hierarchical partition of said dynamic data points;

generating a block partition in the product space of fixed kernels and dynamic data points, a block in said block partition containing one or more kernels grouped together by said hierarchical partition of said fixed kernels and one or more dynamic data points grouped together by said hierarchical partition of said dynamic data points;

performing an expectation step to compute a variational distribution assigning the same variational membership probability to all fixed kernels within a block for all dynamic data points in the same said block from said block partition;

performing a variational maximization step that updates said dynamic data points towards said kernel density modes;

at convergence, assigning data points to clusters when corresponding dynamic data points have converged to a same mode, wherein data points are assigned in accordance with modes in an underlying kernel density function.

2. The method of claim 1, trajectories of said dynamic data points constrained to pass through data points within said fixed data set, said method comprising:
explicit computation of shifts for all said dynamic data points in first iteration; and implicit computation of shifts for all said dynamic data point in a subsequent iteration.

3. The method of claim 1, said block partition being represented as a marked partition tree.

4. The method of claim 1, the kernels having Gaussian profiles.

5. The method of claim 4, the distance measure used in kernels being Mahalanobis distance.

6. The method of claim 4, the distance measure used in kernels being induced from a finitely positive semi-definite function, and the mode-seeking algorithm performed under an explicit feature mapping into Hilbert space.

7. The method of claim 6, the finitely positive semi-definite function being cosine similarity defined for non-negative feature vectors.

8. A device comprising:
a processor;
executable instructions operable by said processor, said executable instructions comprising a mode seeking method for generating clusters of data points within a given fixed data set, said method comprising:
generating a hierarchical partition of a plurality of fixed kernels, each of said fixed kernels having a fixed location at a data point in said fixed data set;
creating a copy of said data set to create a set of dynamic data points;
iteratively moving said dynamic data points using a variational expectation-maximization process to approximate kernel density modes by iteratively until convergence performing a first method comprising:
generating an initial hierarchical partition of said dynamic data points;
generating a block partition in the product space of fixed kernels and dynamic data points, a block in said block partition containing one or more kernels grouped together by said hierarchical partition of said fixed kernels and one or more dynamic data points grouped together by said hierarchical partition of said dynamic data points;
performing an expectation step to compute a variational distribution assigning the same variational membership probability to all fixed kernels within a block for all dynamic data points in the same said block from said block partition;
performing a variational maximization step that updates said dynamic data points towards said kernel density modes;
at convergence, assigning data points to clusters when corresponding dynamic data points have converged to a same mode, wherein data points are assigned in accordance with modes in an underlying kernel density function.

9. The device of claim 8, at least two of said kernels having differently scaled bandwidths.

10. The device of claim 8, all of said kernels having the same bandwidth.

11. The device of claim 8, said hierarchical partition of data and kernels comprising:

a data partition tree defining summarizing statistics about groups of said data in partition;
a kernel partition tree summarizing defining statistics about said kernels in partitions; and
using at least one of these statistics in at least one of the variational E-step and the variational M-step.

12. The device of claim 11, said statistics comprising at least one summarizing statistic stored in said kernel partition tree.

13. The device of claim 12, said maximization step comprising a variational mean shift maximization step.

14. The device of claim 12, said maximization step comprising a variational medoid shift maximization step.

15. The device of claim 12, said maximization step comprising a variational quick shift maximization step.

16. A computer readable storage medium for storing computer readable instructions, the computer readable instructions when executed by one or more processing devices that perform a mode seeking method for generating clusters of data points within a given fixed data set, said method comprising:
generating a hierarchical partition of a plurality of fixed kernels, each of said fixed kernels having a fixed location at a data point in said fixed data set and each kernel's location parameter corresponding to a different data point in the data set;
creating a copy of said data set to create a set of dynamic data points;
iteratively moving said dynamic data points using a variational expectation-maximization process to approximate kernel density modes by iteratively until convergence performing a first method comprising:
generating an initial hierarchical partition of said dynamic data points; generating a block partition in the product space of fixed kernels and dynamic data points, a block in said block partition containing one or more kernels grouped together by said hierarchical partition of said fixed kernels and one or more dynamic data points grouped together by said hierarchical partition of said dynamic data points;
performing an expectation step to compute a variational distribution assigning the same variational membership probability to all fixed kernels within a block for all dynamic data points in the same said block from said block partition;
performing a variational maximization step that updates said dynamic data points towards said kernel density modes;
at convergence, assigning data points to clusters when corresponding dynamic data points have converged to a same mode, wherein data points are assigned in accordance with modes in an underlying kernel density function.

17. The computer readable storage medium of claim 16, said expectation step solving a constrained optimization problem comprising:
traversing a marked partition tree representation for said block partition within said product space from a lowest level to a highest level and reducing nested constraints to a single equation at said highest level involving one Lagrange multiplier and solving said single equation to determine said Lagrange multiplier;
traversing said marked partition tree representation from said highest level to said lowest level and resolving Lagrange multipliers for each of said partitions by back-substitution of a previously resolved Lagrange multiplier; and using said Lagrange multipliers to determine said variational distribution.

18. The computer readable storage medium of claim 17, said method further comprising:
the number of constraints in said constrained optimization being a number of lowest marked nodes in said marked partition tree.

19. The computer readable storage medium of claim 16, wherein the block partition includes a kernel partition corresponding to a kernel partition tree and a data partition corresponding to a data partition tree.

20. The computer readable storage medium of claim 19, wherein the step of generating the block partition comprises starting from a root of the kernel partition tree and a root of data partition tree and recursively expanding a granularity of a group of kernels in the kernel partition or a group of data in the data partition until a predefined criterion is satisfied.

* * * * *